(12) United States Patent
Shimoni

(10) Patent No.: US 8,619,048 B2
(45) Date of Patent: Dec. 31, 2013

(54) METHOD AND DEVICE OF STROKE BASED USER INPUT

(75) Inventor: Idan Shimoni, Hararit-Doar-Na Misgav (IL)

(73) Assignee: MoonSun io Ltd., Haifa (IL)

( * ) Notice: Subject to any disclaimer, the term of this patent is extended or adjusted under 35 U.S.C. 154(b) by 264 days.

(21) Appl. No.: 13/058,015

(22) PCT Filed: Aug. 6, 2009

(86) PCT No.: PCT/IL2009/000767
§ 371 (c)(1),
(2), (4) Date: Feb. 8, 2011

(87) PCT Pub. No.: WO2010/016065
PCT Pub. Date: Feb. 11, 2010

(65) Prior Publication Data
US 2011/0134068 A1 Jun. 9, 2011

Related U.S. Application Data

(60) Provisional application No. 61/188,231, filed on Aug. 8, 2008.

(51) Int. Cl.
*G06F 3/041* (2006.01)
*G06F 3/033* (2013.01)
*G06K 9/00* (2006.01)

(52) U.S. Cl.
USPC .................. 345/173; 382/187; 715/863

(58) Field of Classification Search
USPC ........................................ 345/173
See application file for complete search history.

(56) References Cited

U.S. PATENT DOCUMENTS

| | | | |
|---|---|---|---|
| 5,521,986 A * | 5/1996 | Curtin et al. ................ | 382/187 |
| 5,706,026 A | 1/1998 | Kent et al. | |
| 2002/0015064 A1 * | 2/2002 | Robotham et al. ........... | 345/863 |
| 2002/0109677 A1 | 8/2002 | Taylor | |
| 2003/0156145 A1 * | 8/2003 | Hullender et al. ........... | 345/863 |
| 2003/0214481 A1 * | 11/2003 | Xiong ........................... | 345/157 |
| 2004/0196256 A1 | 10/2004 | Wobbrock et al. | |
| 2005/0225538 A1 * | 10/2005 | Verhaegh ...................... | 345/173 |
| 2007/0002030 A1 * | 1/2007 | Hsu .............................. | 345/173 |
| 2008/0036743 A1 * | 2/2008 | Westerman et al. ......... | 345/173 |
| 2008/0309634 A1 * | 12/2008 | Hotelling et al. ............ | 345/173 |
| 2009/0122018 A1 * | 5/2009 | Vymenets et al. ........... | 345/173 |
| 2009/0231282 A1 * | 9/2009 | Fyke ............................ | 345/169 |

FOREIGN PATENT DOCUMENTS

| | | |
|---|---|---|
| EP | 1600881 | 11/2005 |
| WO | WO 2010/016065 | 2/2010 |

OTHER PUBLICATIONS

International Preliminary Report on Patentability Dated Feb. 17, 2011 From the International Bureau of WIPO Re. Application No. PCT/IL2009/000767.
International Search Report and the Written Opinion Dated Dec. 7, 2009 From the International Searching Authority Re.: Application No. PCT/IL2009/000767.

\* cited by examiner

*Primary Examiner* — Charles V Hicks

(57) ABSTRACT

A method of inputting a character to a computing unit. The method comprises capturing a stroke drawn by a user in relation to a reference zone, identifying a combination of a shape and a relative position of the stroke in relation to the reference zone, automatically selecting one of a plurality of characters from according the combination, and providing the selected character as an input to the computing unit from the user.

53 Claims, 12 Drawing Sheets

FIG.3

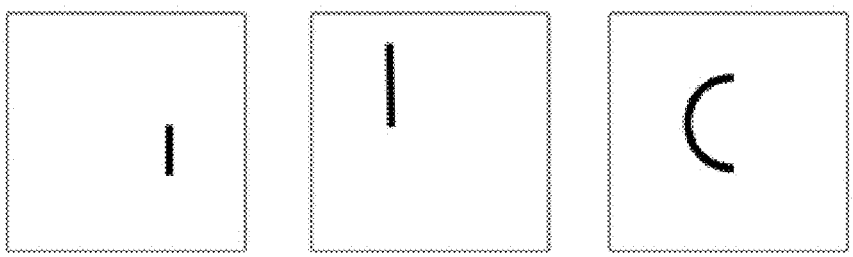
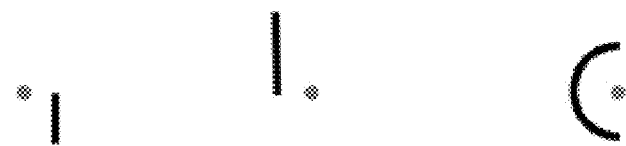
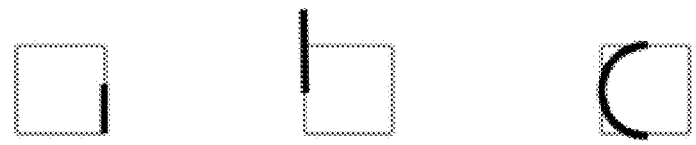
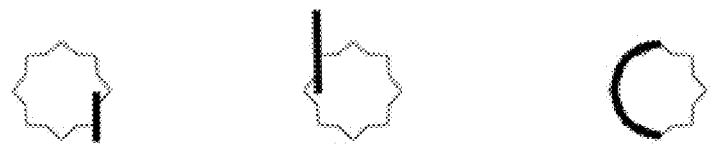
FIG. 4

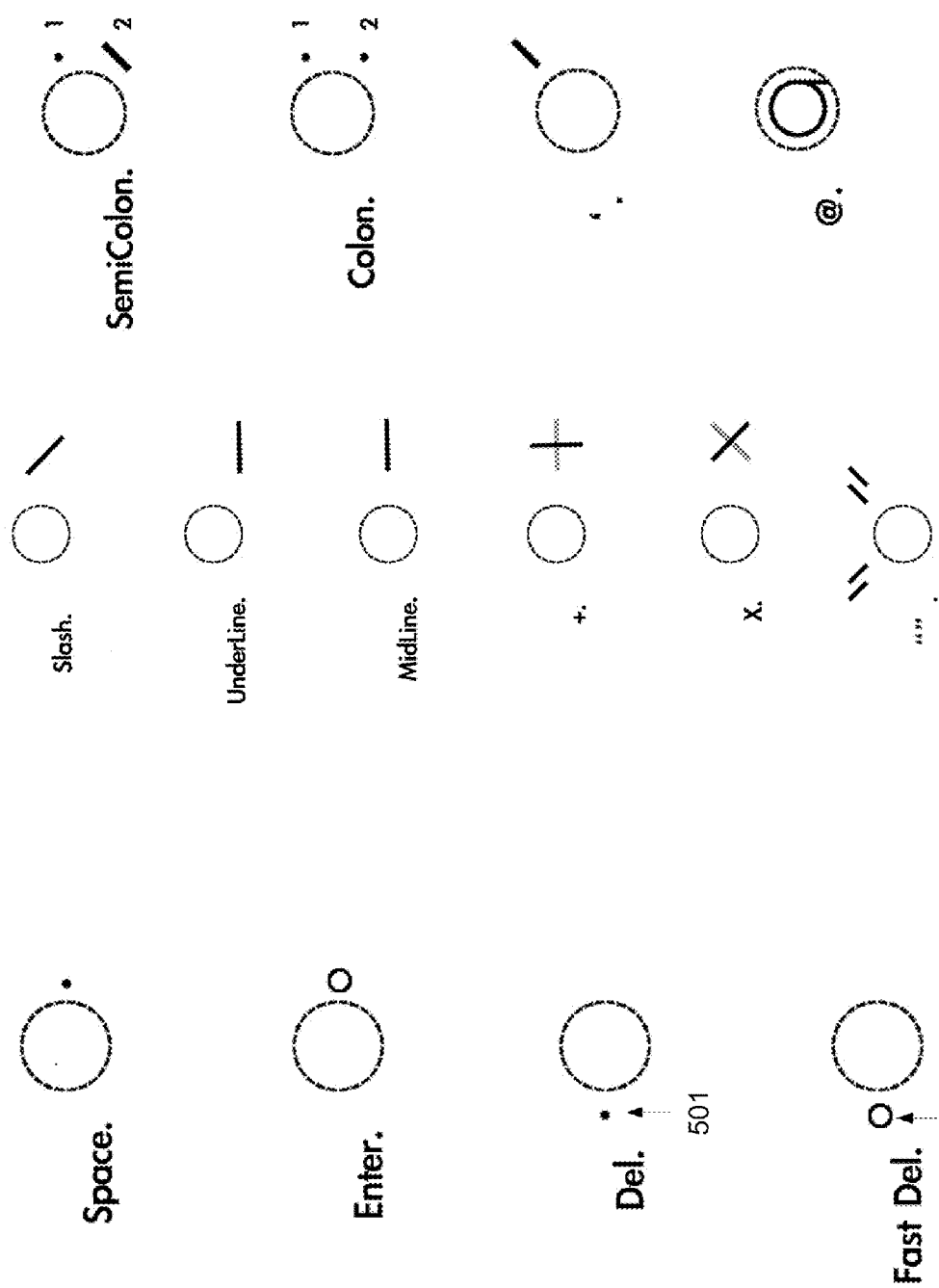

Double.

Commands.

Coder.

METHOD AND DEVICE OF STROKE BASED USER INPUT

RELATED APPLICATIONS

This application is a National Phase of PCT Patent Application No. PCT/IL2009/000767 having International filing date of Aug. 6, 2009, which claims the benefit of priority of U.S. Provisional Patent Application No. 61/188,231, filed on Aug. 8, 2008. The contents of the above applications are all incorporated herein by reference.

FIELD AND BACKGROUND OF THE INVENTION

The present invention, in some embodiments thereof, relates to method and system for user interface and, more particularly, but not exclusively, to a method and system for user interface based on strokes.

As electronic devices have more and more the functionalities, the demand for alphanumeric input and extended controls having a limited size and can be easily integrated is increased. Several solutions for data entry for such devices exist like compact keyboards, handwriting recognition, and voice recognition.

Among the possible solutions, handwriting recognition is one of the more popular solutions because it is intuitive, fast, and requires a small footprint on a device. Different handwriting recognition based methods and devices are known and some of them require inputting only special, simplified strokes, for example Unistroke™ from the Xerox Corporation and Graffiti™ from Palm, Inc. Some of the handwriting recognition based methods and devices require the use of a stylus or pen as an input device and a high resolution input device such as a pressure sensitive or resistive touchpad.

For example, U.S. Pat. No. 7,519,748, issued on Apr. 14, 2009, describes a data entry system comprising of: an input surface, a limited number of input elements of any shape and positions at the input surface, and a processing device (for detecting a continuous sweeps of an input object over the input surface, for tracking a sequence of the input elements interacted with the input object during such sweeps, and for generating a function associated with the sequence after the sweep is completed). A system characterized in that the processing device is adapted for time independent and reliable detecting a sequence of input elements, even if an input object could interact with several input elements simultaneously.

Another exemplary stroke based input method and system is described in U.S. Pat. No. 6,731,803 issued on May 4, 2004 and suitable for hand held processor implemented devices with small touch pad writing surfaces. The writing surface is divided into a grid by a number of spaced discrete points. The user is instructed to write, as by a stylus, characters such as alphabetic characters, numbers or symbols with the writing path extending through a predetermined sequence of the points which define the grid. The stylus must pass sequentially within a specified distance of mandatory points for processor recognition of each written character and may additionally pass within a predetermined distance of optional points.

SUMMARY OF THE INVENTION

According to some embodiments of the present invention there is provided a method of inputting a character to a computing unit. The method comprises capturing a stroke drawn by a user in relation to a reference zone, identifying a combination of a shape and a relative position of the stroke in relation to the reference zone, automatically selecting one of a plurality of characters from according the combination, and providing the selected character as an input to the computing unit from the user.

Optionally, the combination depicts a form indicative of the selected character.

Optionally, the method further comprises sequentially repeating the capturing, the identifying the selecting, and the providing so as to create a text paragraph.

Optionally, the reference zone is a virtual circle, the capturing further comprising displaying the reference zone on a touch screen.

Optionally, the stroke is a continuous touch gesture of the user on a touch screen.

More optionally, the user uses a thumb for performing the stroke.

Optionally, the method further comprises dynamically changing the size of the reference zone according to the captured stroke.

Optionally, the method further comprises adjusting the selected character according to a member of a group consisting of: a pressure applied during the stroke, a direction of the stroke, a pace of the stroke, a pressure applied on an input surface performing the capturing, an additional input received by a device performing the capturing, and an additional stroke performed by a touch gesture on an input surface performing the capturing.

More optionally, the adjusting comprises selecting between an upper case and a lower case of the character.

Optionally, the stroke is a touch gesture applied on an input surface.

Optionally, the method further comprises detecting an interlude in a movement a pointing element used for performing the stroke, the identifying being performed according to the combination and the interlude.

More optionally, the further comprises measuring a level of a pressure applied during the touch gesture, the identifying being performed according to the combination and the level.

Optionally, the method further comprises detecting a direction of the stroke, the identifying being performed according to the combination and the direction.

Optionally, the automatically selecting comprises automatically selecting one of the plurality of characters and a plurality of commands for executed by the computing unit.

Optionally, the plurality of characters comprises alphabetic characters, digits, punctuations, and mathematical operations.

Optionally, the computing unit is selected from a group consisting of: a cellular phone, a phone, a remote control, an electric book, a game console, a camera, a laser pointer, a navigation system, a video recorder, a music player, and an audio recorder.

Optionally, the identifying comprises identifying a combination of the shape, the relative position, and at least one member of a group consisting of a direction of the stroke, an interlude performed during the stroke an interlude performed during the stroke, a user input received during the stroke, and a pressure applied during the stroke.

Optionally, plurality of characters comprises alphabetic characters of a plurality of languages.

Optionally, the method further comprises magnifying an editing area displayed in a presentation device, the character being imputed to the editing area.

According to some embodiments of the present invention there is provided a human user interface of allowing a user to input a character to a computing unit. The human user interface comprises an input surface for capturing a stroke drawn by a user in relation to a reference zone, an encoder for encoding a shape and a relative position of the stroke in relation to the reference zone, a stroke recognition module for automatically identifying a character of a plurality of characters according to the shape and relative position, and an outputting interface for outputting the character.

Optionally, the human user interface further comprises a memory for hosting a plurality of stroke specifications, at least one of the plurality of stroke specifications being indicative of one of the plurality of characters, the automatically identifying comprises identifying a unique combination of the shape and the relative position and selecting the character by identifying a match between the unique combination and one of the plurality of stroke specifications.

More optionally, at least one of the plurality of stroke specifications is indicative of a word, the stroke recognition module being configured for selecting the word by identifying a match between the unique combination and one of the plurality of stroke specifications.

Optionally, the input surface is a click wheel and the reference zone being a circle, the circle and the click wheel being concentric.

Optionally, the stroke is performed by a pointing element of a group consisting of: a finger, a stylus, and a laser marker.

More optionally, the input surface is configured for capturing the stroke by detecting a continuous touch gesture of the pointing element, each the character being a different character of a natural language alphabet.

Optionally, the input surface is configured for displaying the reference zone thereon.

More optionally, the input surface is configured for displaying a menu in the reference zone, the stroke recognition module being configured for navigating in the menu according to the stroke.

More optionally, the menu is a sub menu of a hierarchical menu, the stroke recognition module being configured for navigating in the menu hierarchical menu and respectively instructing a display of a plurality sub menus according to the stroke.

More optionally, the stroke is performed by at least one of a click and a touch gesture.

Optionally, the reference zone is circular.

Optionally, the reference zone is rendered on the input surface.

Optionally, the user interface is configured to allow the user to reposition the reference zone in relation to the orientation thereof.

More optionally, the input surface is configured for capturing at least one of an additional stroke and a click, the stroke recognition module being configured to adjust the character according to the at least one additional stroke and click.

Optionally, the device is integrated into a handheld device, the character being used as a user input of an application executed by the handheld device.

Optionally, the outputting interface is wireless interface configured to forward the character to an external device.

Optionally, the first and second of the plurality of stroke specifications are respectively indicative of a lower case form and an upper case form of an alphabetic character, the first stroke specification being matched with a first stroke having a first outline and the second stroke specification being matched with a second stroke having a second stroke, the second stroke comprises the first stroke.

Optionally, the human user interface further comprises a user interface module for allowing a user to associate at least one of the plurality of stroke specifications with a member of a group consisting of a character, a command, a digit, and a paragraph, the stroke recognition module being configured for selecting the member by identifying a match between the unique combination and the at least one stroke specification, the outputting interface being configured for outputting the member.

Optionally, the input surface is attached on a man machine interface device.

Optionally, the human user interface further comprises a curser module configured for moving a curser according to the stroke.

Optionally, the input surface is configured for displaying a plurality of reference zones and capturing a plurality of strokes each separately performed in relation to one of the plurality of reference zones, the stroke recognition module being configured for separately performing the identifying and selecting for each the separately performed stroke so as to allow the outputting interface to output a plurality of characters to at least one application accordingly.

Optionally, the human user interface further comprises a housing having a width of less than 5 millimeters for supporting the input surface, the encoder, and the stroke recognition module.

More optionally, the housing is attached to a surface of a device, the outputting interface configured for outputting the character as input to the device.

Optionally, the input surface is mounted on top of at least one of a gear stick and a steering wheel and the outputting interface being configured for outputting the character to a vehicle system.

According to some embodiments of the present invention there is provided a method of inputting a character. The method comprises capturing a stroke drawn by a user and outline a form of a character in combination with an outline of a circular reference zone, computing the character according to a of the stroke in relation to the circular reference zone, and outputting the character as an input of the user.

Optionally, at least one of the form and the reference zone is mnemonic for the character.

According to some embodiments of the present invention there is provided a human user interface of allowing a user to input a character to a computing unit. The human user interface comprises a reference spot sensor for measuring a finger gesture performed in relation to a reference spot, a finger holding element for mounting the sensor on a finger of a user, an encoder for encoding a shape and a relative position of the finger gesture in relation to the reference spot, and stroke recognition module for automatically identifying a character according to the shape and the relative position.

Optionally, the stroke recognition module is hosted on a computing unit and configured for forwarding the character thereto, further comprises an outputting interface for transmitting the shape and the relative position to the stroke recognition module.

Optionally, the reference spot sensor comprises at least one image sensor for capturing an image and using one of the image and a portion of the image as the reference spot.

According to some embodiments of the present invention there is provided a human user interface of allowing a user to input a character to a computing unit. The human user interface comprises a touch screen for presenting a menu on a reference zone and for capturing a plurality of strokes drawn by a user, each the stroke being performed in relation to the reference zone and a stroke recognition module for automatically identifying a character of a plurality of characters and navigating in the menu, each one of the identifying and navigating being performed according to a different stroke of the plurality of strokes.

Optionally, each the stroke is a performed by a continuous touch gesture on the touch screen.

Optionally, the stroke recognition module is configured for selecting menu items of the menu according to the plurality of strokes.

More optionally, each the stroke is performed as a discrete and continuous touch gesture performed on the touch screen, the stroke recognition module being configured for navigating among a plurality of sub menus according to the stroke.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volitile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is a schematic illustration of set of pairs of stroke specifications, each pair associated with a different alphabetic character, according to some embodiments of the present invention;

FIG. 4 is a schematic illustration of exemplary shapes if a reference zone according to some embodiments of the present invention;

FIG. 7 is a schematic illustration of a set of stroke specifications which are associated with editing commands, according to some embodiments of the present invention;

FIG. 8 is a schematic illustration of a set of stroke specifications which are associated with notations, punctuations, and mathematical operations, according to some embodiments of the present invention;

DESCRIPTION OF EMBODIMENTS OF THE INVENTION

Figure 1:
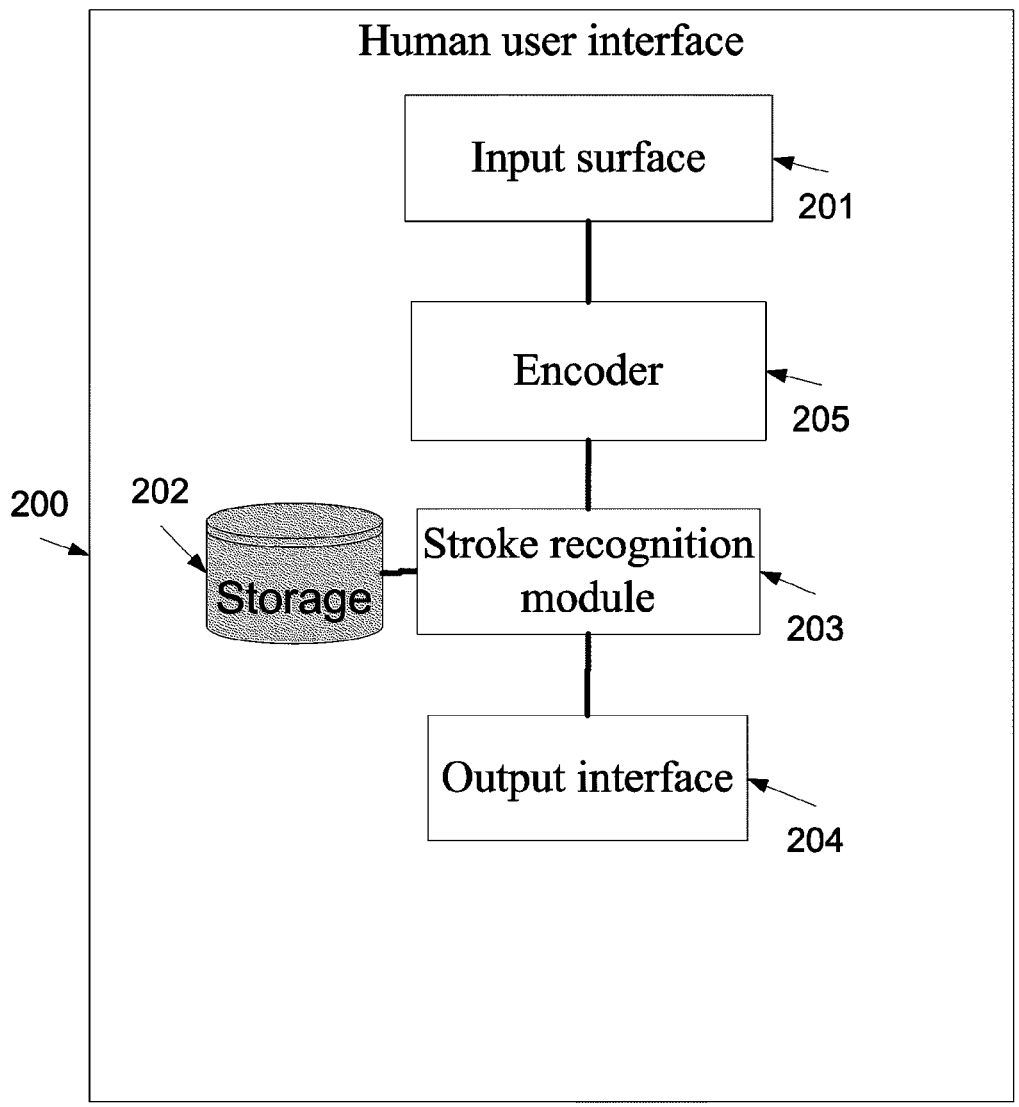
FIG. 1 is a schematic illustration of a human user interface of converting one or more strokes to a character and/or a command based on a shape formed by the strokes and the position of the shape relative to a reference zone, according to some embodiments of the present invention.

The present invention, in some embodiments thereof, relates to method and system for user interface and, more particularly, but not exclusively, to a method and system for user interface based on strokes.

According to some embodiments of the present invention, there is provided a method and a human user interface for converting a stroke, optionally performed as a touch gesture on an input surface, such as a screen touch, to a character according to the shape of the stroke and the relative position thereof in relation to a reference zone, optionally circular. Optionally, strokes are converted to alphabetic characters, digits, notations, punctuations and/or commands. The human user interface may be used for operating an electric device, such as a cellular phone, music player, a remote control, an electric book, a game console, a digital camera, a remote control and the like, and/or for inputting characters thereto.

Optionally, the human user interface allows the user to input any alphabetic character of a natural language alphabet, such as Latin alphabet, with a single continuous touch gesture, optionally without moving her wrist. Optionally, the human user interface allows the user to her finger, for example her thumb, for performing the stroke.

Optionally, the different characters may be distinguished by the direction of the stroke, the pressure the user applies during while stroking, an input received from another user interface, such as a button, and/or another stroke and/or a click on the input surface of the device.

According to some embodiments of the present invention, there is provided a method of converting a user stroke to a character according to a mnemonic form it creates when combined with an outline of a circular reference zone, such as a circle. The method is based on capturing a user stroke that outlines a form of an alphabetic character when combined with an outline of the circular reference zone. The formed alphabetic character is computed according to the shape of the stroke and the relative position of the shape in relation to the circular reference zone. Such a computation allows outputting the character as an input of the user to an electric device and/or a computing unit.

According to some embodiments of the present invention there is provided a finger gripping device for converting finger gestures to characters according to a shape it forms and the position of the shape in relation to a reference spot.

According to some embodiments of the present invention there is provided a human user interface having a touch screen that allows user to input characters and navigating menus by touch gestures, optionally discrete and continuous. The touch screen displays a reference zone, such as a circle, and captures strokes which are indicative of characters when combined with the reference zone. Furthermore, the touch screen displays a menu on the reference zone and captures touch gestures which are indicative of menu navigation and/or selection actions. Optionally, the touch gestures are performed by a single finger, optionally the thumb. Optionally, the menu is hierarchical and the navigation is among sub menus. Optionally, a single continuous touch gesture is used for navigating among a plurality of sub menus.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is also made to FIG. 1, which is a schematic illustration of a human user interface 200 of converting a stroke of a pointing element, such as a finger or a stylus, to a character and/or a command based on a shape formed by the stroking of the pointing element and the relative position of the shape in relation to a reference zone that is optionally displayed on an input surface 201, according to some embodiments of the present invention.

For clarity, the stroke is created by a touch gesture of a pointing element, such as a tip of a finger, a stylus, and/or a writing element, for example a pen or a pencil, on top of a input surface 201 or in proximity thereto. The stroke is performed in relation to a reference zone, such a circle an ellipse, which is presented on the input surface. Optionally, the stroke is a continuous touch gesture of the pointing element on the input surface. A single slide stroke may be represented as a continuous line, optionally curved. In such an embodiment, the human user interface 200 allows the user to input characters, such as alphabetic characters and digits using a single finger, optionally her thumb. In such a manner, the human user interface 200 may use an input surface, such a touch screen or touch pad, to present the reference zone and allow the user to slide her thumb for typing all the alphabetic characters and digits of a natural language alphabet, such as Latin alphabet, without moving other fingers and/or the wrist. Additionally or alternatively, the user may use two fingers for substantially simultaneously, or simultaneously, inputting a number of characters. In such an embodiment, the input surface 201 captures two strokes which are separated and converted to characters according to their stating points, shape and/or relative position. In such an embodiment, the characters may be inputted faster.

As outlined above, the human user interface includes input surface 201 for separately capturing and/or recording strokes which are performed by a human user. For example, the input surface 201 may be an input pad, touch panel, a touch screen, such as a liquid crystal display (LCD) screen with an integrated touchpad, a multifunctional touch button, a multifunctional pushbutton, a scroll wheel, and a selection device based on a combination of a button and a scroll wheel, also known as a click wheel, for instance as used in the IPod™ device, see IPod Classic™ device, which the specification thereof is incorporated herein by reference, an optical coordinate input detection device, and a surface having one or more optical sensors, such as complementary metal oxide semiconductor (CMOS) based or charge coupled device (CCD) based sensors, for capturing strokes which are performed by a human user. Optionally, the input surface 201 is a click wheel and the reference zone is a circle which is concentric thereto. In such a manner, a click wheel is used for both character inputs, for example as described below, and for files and/or applications navigation, selection and/or operation. The input surface 201 is connected to an encoder 205 that encodes the shape of the stroke and the relative position of the stroke in relation to the reference zone.

According to some embodiments of the present invention, the reference zone is a virtual shape that is presented on an input surface, such as a touch screen. In such an embodiment, the virtual shape may be dragged to various locations on the touch screen, allowing the user to assign an area of the touch screen as an active area for inputting characters. It should be noted that by changing the location of the reference zone changes the relative position coordinates. In such an embodiment, the reference zone may be in any location of the touch screen.

The human user interface further includes memory storage 202 for hosting a plurality of stroke specification records. For brevity, each one of the stroke specification records and/or a group of the stroke specification records may be referred to herein as a stroke specification. Each one of the stroke specifications defines a unique combination of a stroke shape and a stroke relative position in relation to the reference zone. Optionally, the relative position is between the initial stroking point and the center of the reference zone. Optionally, the relative position is between the geometric center of the stroke shape and the center of the reference zone.

Some or all of the stroke specifications are associated with alphabetic characters, optionally of a natural language alphabet, such as Latin alphabet, Cumaean alphabet, Hebrew alphabet, and Arabic alphabet. Different strokes are separately associated with one of the alphabetic characters. In such an embodiment, the number of the stroke specifications is at least as the number of alphabetic characters of the respective alphabet language. Additionally or alternatively, a stroke specification may be associated with a command, such as an editing and/or an operation command, for example as described below.

Figure 2:
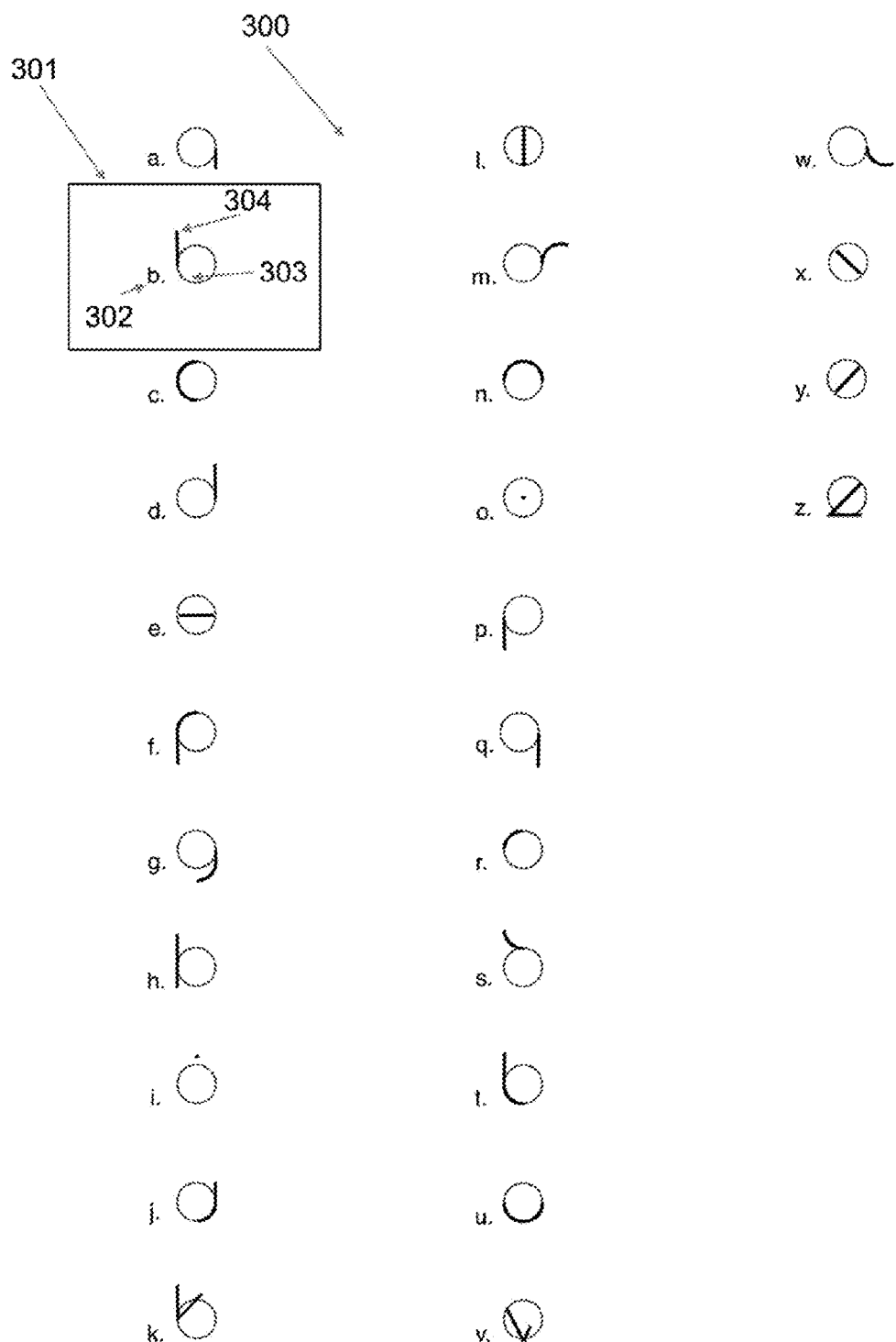
FIG. 2 is a schematic illustration of set of stroke specifications associated with English alphabetic characters, according to some embodiments of the present invention.

Reference is now also made to FIG. 2, which is a schematic illustration of set of stroke specifications 300 associated with English alphabetic characters, according to some embodiments of the present invention. The shape and the position parameters of each exemplary stroke specification are illustrated relatively to an exemplary reference zone, a circle. Each member of the set of stroke specifications 300 defines a unique combination of a stroke shape and a relative position in relation to the circle, for example as shown at 301, which is a schematic illustration of a stroke specification that is associate with the alphabetic character b 302. In the set depicted in FIG. 2, the reference zone is a circle 303 marked by a dashed line. The stroke position and shape are depicted by a bold line, for example as shown at 304. As shown at 304 and 306, strokes with similar shapes may be used in different stroke specifications as long as their relative position in relation to position of the reference zone 303 is different.

As depicted in FIG. 1, the human user interface 200 further includes a stroke recognition module 203 for identifying a match between the shape and the position of a stroke, which is captured by the input surface and encoded by the encoder 205 and one of the stroke specifications. The match allows the stroke recognition module 203 to pick, from the storage 202, the character or the command with which the matched stroke recognition module 203 is associated, or a value that represents the character or the command, and to forward it to an output interface 204, such as a character generator. The output interface 204 forwards the character, for example the alphabetic character, as an input to an application which is executed on a device hosting or integrating the human user interface 200, to an electronic device and/or a computing unit that is connected to the human user interface 200, and/or to a display unit, such as to the input surface 201 that is optionally a touch screen. Optionally, the character triggers the execution of a command. Optionally, stroke recognition module 203 ignores outputs of the input surface for a short period after a stroke is detected. In such a manner, the stroke recognition module 203 may separate between sequential strokes which are indicative of different characters, such as alphabetic characters or numbers, and/or commands.

Figure 3:
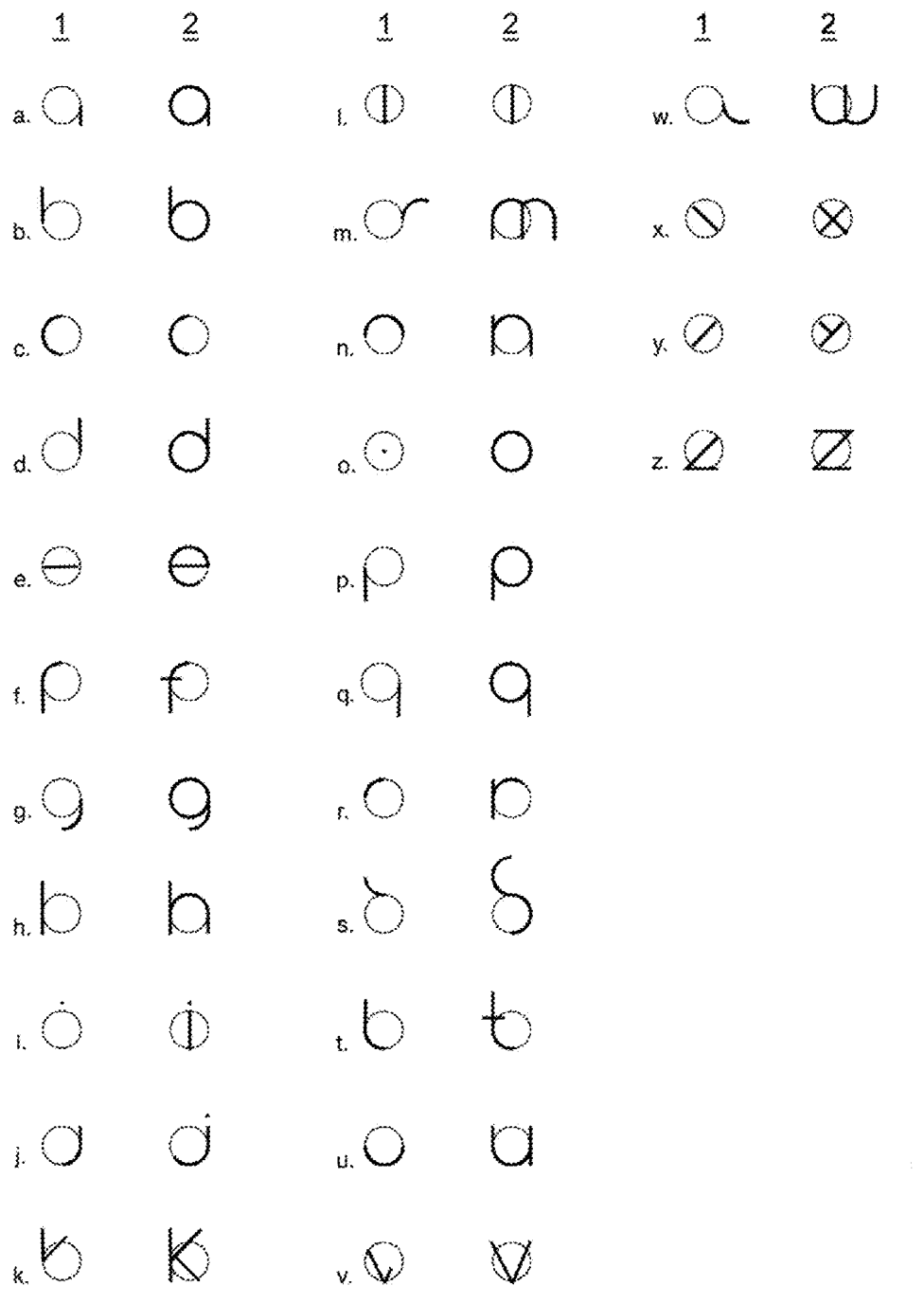

Optionally, each member of a set of stroke specifications defines a stroke based on a continuous touch gesture. Optionally, some or all of these stroke specifications define a sequence of strokes, for example as depicted in FIG. 3, stroke specifications which are associated with the characters t, f and k. In such an embodiment, the shape parameter is based on the shape that is formed by the composition of the strokes and the relative position parameter is the position of the first stroke, the second stroke, the combination of strokes and/or a meeting point between the strokes.

According to some embodiments of the present invention, a combination between the stroke and the reference zone depicts, or substantially depicts, the character with which the related single stroke specification is associated. For example, a straight stroke that starts approximately at the leftmost corner of a circular reference zone and pulled downwards depict, when considered together with the reference zone, the alphabetic character P. Such a stroke is optionally associated with the character P.

According to some embodiments of the present invention, the reference zone is circular, for example as shown at FIG. 2 and FIG. 3. Optionally, the reference zone is a circle. Such a reference zone is specifically useful for certain natural language alphabets, such as Latin and Hebrew. In these alphabets, many alphabetic characters comprise circular elements and/or semi circular elements. For example, most of the lowercase English alphabetic characters include circular elements, for example a, b, d, e, g, o, q, and p or semi circular elements, for example c, h, m, n, s. w, and y. This phenomena allows outlining the vast majority of the alphabetic characters by a touch gesture of a single slide stroke toward and/or from the circular reference zone or by stroke based on a continuous touch gesture on a portion of the circular reference zone, for example as shown at FIG. 2. Therefore, the circularity of the reference zone is mnemonic to remember the strokes, or the form of the strokes in combination therewith, which are indicative of alphabetic characters and makes the alphabetic character input process intuitive to an individual. In particular, when the reference zone is a circle, the individual mostly has only to figure out how to outline the form of the alphabetic character she wants to input by drawing a stroke in proximity to the reference zone in a manner they jointly depict the alphabetic character and not to recall which stroke is associated with this alphabetic character. Thus, learning how to use such a human user interface 200 does not require memorizing for each alphabetic character a new shape and/or a new stroke but rather implementing a simple and intuitive modus operandi in which the boundaries of the reference zone are part of the outlines of the requested alphabetic character and/or comprises outlines of the requested alphabetic character. In such an embodiment, as the combination of the circle and the stroke outlines an alphabetic character, the size of the circle is indicative of the length of the strokes and size and/or curves of the strokes shape and vise versa. Therefore, the visibility of the circle allows the user to better estimate the length of the stroke she has to slide in order to input a certain word. Optionally, the size of the reference zone is dynamically adjusted according to the length of one or more strokes. For example, if the length of the strokes is estimated to be longer than expected in order to outline a character, the reference zone is enlarged and if the length of the strokes is estimated to be shorter than expected, the reference zone is respectively minimized. Optionally, the length:height ratio of the reference zone is 1:1, 3:4, 4:3. Optionally, the reference zone is fixated on the input surface 201. Optionally, the reference zone is projected in relation to the surface of the input surface 201.

Optionally, the reference zone is semi transparent. In such a manner, the reference zone may be presented, for example rendered, on top of a graphical user interface and/or a display that is presented on the screen of a device integrating the human user interface 200. For example, the reference zone is superimposed on top of a webpage that is displayed on browser hosted by a cellular phone that integrates the human user interface 200.

Optionally, the reference zone is hidden when inactivated for a certain period.

It should be noted that the reference zone may have other shapes, for example a star shape, a dot shape, or a rectangular shape, for example as depicted in FIG. 4.

It should be noted that as the human interface human user interface 200 is designed to intercept strokes which are analyzed according to their position relative to the reference zone, mix ups pertaining to the orientation of the stroke relative to the orientation of the input surface are avoided. Optionally, the reference zone may be repositioned, for example rotated, manually or automatically, toward different edges of the input surface, allowing a user to slide the pointing element from different directions. In such a manner, the user does not have to consider the orientation of the input surface before performing a stroke using the pointing element. Optionally, the reference zone is automatically aligned with the orientation of the input surface, for example according to outputs of an accelerometer and/or a gyroscope that is attached to the human user interface.

Figure 5:
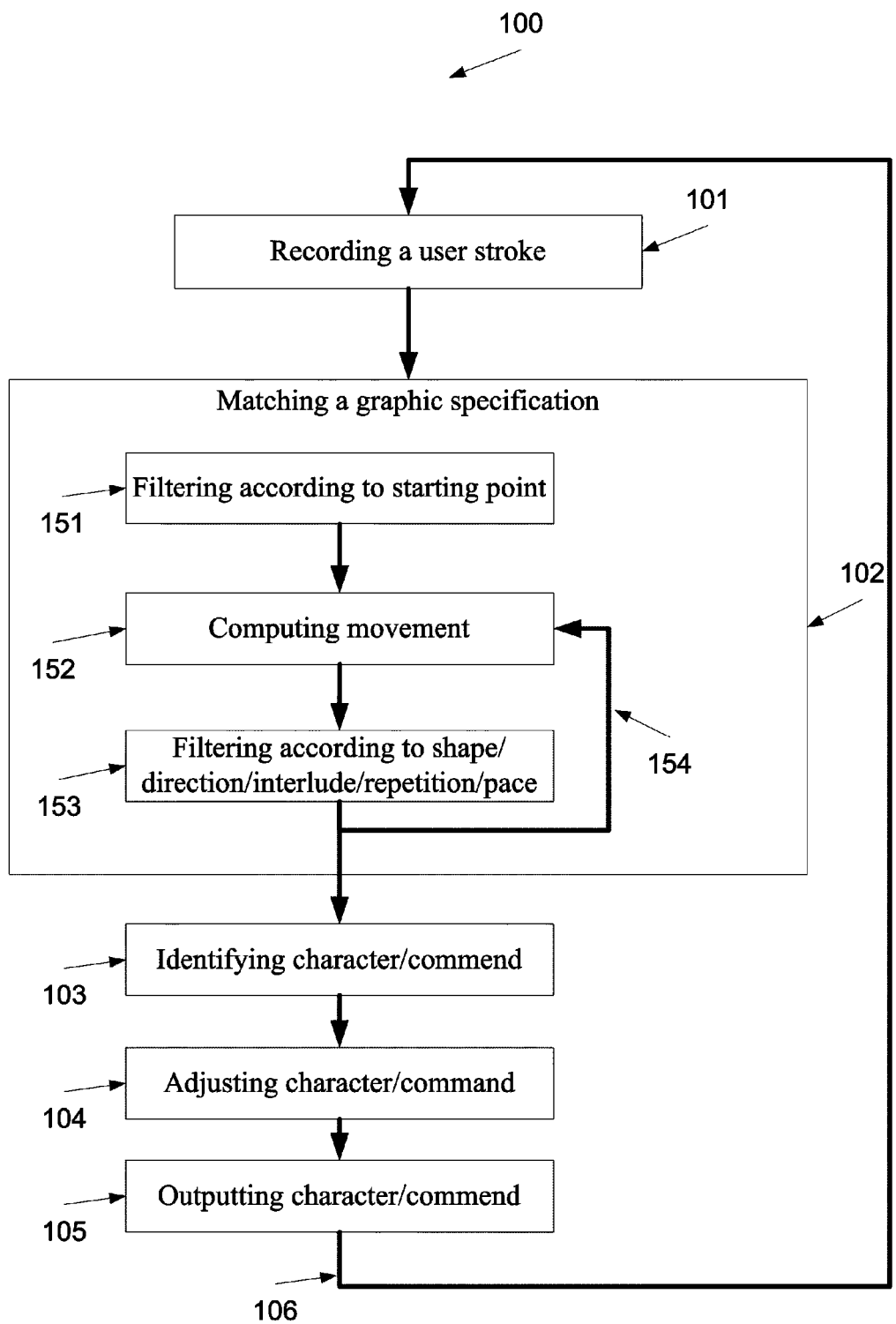
FIG. 5 is a schematic illustration of a method of converting a stroke to a character or a command, based on a combination formed by its shape and its position thereof in relation to a reference zone, such as the aforementioned reference zone, according to some embodiments of the present invention.

Reference is now also made to FIG. 5, which is a schematic illustration of a method 100 of converting a stroke, optionally a single slide stroke, to a character or to a command, based on its shape and on its position thereof in relation to a reference zone, such as the aforementioned reference zone, according to some embodiments of the present invention.

First, as shown at 101, a stroke of a user is recorded, for example using the aforementioned input surface or a finger gripping device, such as described below. Optionally, the recorded data is represented as a vector or a matrix of coordinates of the stroke.

As described above, the unique combination between the shape and the relative position of the stroke is indicative of a certain character or a command that is provided by the user.

As shown at 102, this certain character or command is decoded by identifying a match between the unique combination and one of the stroke specifications. For example, the current shape and position may be matched with the stroke specifications which are stored in storage 202. The matching allows picking a character that is associated with the matched stroke specification so as to convert the single slide stroke which is performed by the user to an input of a conforming character.

Blocks 151-154 depict an exemplary process of identifying a matching stroke specification. First, as shown at 151, stroke specifications are filtered according to the starting point of the stroke. As the stroke specification includes a relative position in relation to the reference zone, the filtering may be performed with low computational complexity. In such an embodiment, each stroke specification indicates a related starting point and or an area in which the starting point should appear. The size and/or shape of this area may be separately defined for each stroke specification, for example based on accumulated statistical data and/or collectively defined to some or all of the stroke specifications. Now, as shown at 152, the movement of the recorded stroke is computed. As shown in 153, this allows further filtering the potential stroke specifications according to shape and optionally direction, interludes, sliding paces, repetitions and the like, for example as described below. As shown at 154, this process is optionally repeated for segments of the strokes. In such a manner, when only one stroke specification is left, the character or the command which is associated therewith is identified and outputted as the character or command inputted by the user.

It should be noted that as the computational complexity of the a process is limited, particularly when the number of stroke specifications is less than 50, for example when stroke specifications represent only the alphabetic characters and digits of a certain natural language alphabet. In such a manner, the method 100 may be implemented by a central processing unit (CPU) or a microprocessor with limited computational power and/or low power system on chip (SOC) that integrates all the components depicted in FIG. 1 into a single integrated circuit (IC).

Now, based on the matching stroke specification, as shown at 103, a command or a character is identified, for example according to the command or the character that is associated therewith.

Optionally, as shown at 104, the outputted character or command is adjusted according to an additional user interface input parameter, for example a simultaneous pressure that is applied on the input surface, for example using another pointing element, such as a finger and/or a simultaneous press on a certain key, for example SHIFT and "adjust volume" in a human user interface that is integrated into a phones. For example, if the certain key is pressed and the character is an alphabetic character, then the identified character is inputted in an upper case form, else the identified character is inputted in lower case form. Optionally, the outputted character or command is adjusted according to the level of pressure that is applied during the stroke on the input surface. For example, if the applied pressure is above a certain level and the character is an alphabetic character, then the identified character is inputted in an upper case form, else the identified character is inputted in lower case form.

Optionally, the outputted character or command is adjusted according to period the user holds the pointing element before and/or after the touch gesture of the stroke. For example, if the stroke is hold for more than a certain period, for example 2 seconds, and the character is an alphabetic character, then the identified character is inputted in an upper case form, else the identified character is inputted in lower case form.

As shown at 105, the character is presented, forwarded to an electric device and/or a computing unit forwarded to otherwise transferred, for example as described above. For example, the character is an alphabetic character that is displayed on the screen of a device using the human user interface 200, such as a cellular phone, and input the alphabetic character to a hosted application, such as an SMS writer.

As shown at 106, the process may be sequentially repeated in a plurality of iterations so as to allow user to input a plurality of alphabetic characters, digits, and/or commands in a raw. Optionally, an interlude is taking between the iterations. Optionally, an interlude sign is presented to the user, for example by diming the reference zone. Optionally, the size or the location of the reference zone is dynamically changed according to the length and/or starting points of the strokes.

According to some embodiments of the present invention, the stroke specifications are used for decrypting a message encrypted by user strokes. In such an embodiment, a message or a password may be encrypted by a set of strokes which is later decrypted to create a set of characters and/or commands.

According to some embodiments of the present invention, a number of stroke specifications, each defining a different unique combination of shape and relative position, are associated with a common character, for example as shown at FIG. 3. In such an embodiment, while one stroke specification is associated with a first representation of a certain character, for example a lower case representation, a different stroke specification is associated with a second representation of the certain character, for example an upper case representation.

Optionally, the shape of a certain one stroke specification is part of a shape of another stroke specification. For example, as depicted in FIG. 3, one representation associated with the alphabetic character I includes a dot and a straight line, aligned on a bisector that divides the reference zone to left and right sides, and another representation of the alphabetic character I includes only the dot in a corresponding location on the bisector. For clarity, the pointing element creates a dot by clicking on the input surface 201.

It should be noted that as the reference zone constitutes a part of the outline of the requested word, the length of a stroke that is visually indicative of a requested alphabetic character, and therefore the time and effort it takes to create the stroke, is reduced.

Figure 6:
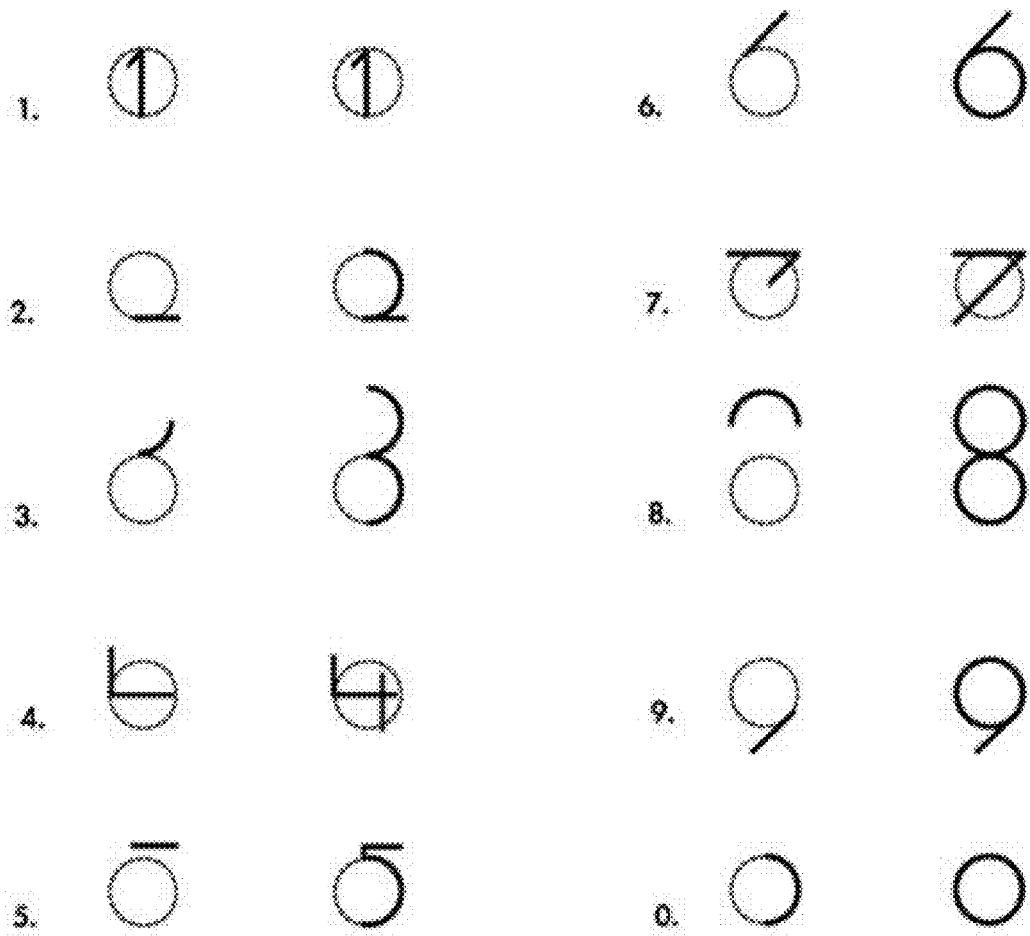
FIG. 6 is a schematic illustration of a set of pairs of stroke specifications, each associated with a common digit, according to some embodiments of the present invention.

According to some embodiments of the present invention, the relative position and shape of the current user stroke is matched with stroke specifications which are associated with digits, for example as shown in FIG. 6 that describes pairs of stroke specifications, each associated with a common digit.

According to some embodiments of the present invention, the position and shape of the current user stroke is matched with stroke specifications which are associated with editing commands, such as space, enter, and delete (del), for example as shown in FIG. 7. For clarity, a single slide stroke that is based on clicking, for example placing a pointing element for a short duration, for example less than one 2 second, less than one second, and less than half a second, is depicted in the figures as a dot, for example as shown at 501. A single slide stroke that is based on placing a pointing element for a longer duration, for example more than one 2 second, more than one second, and more than half a second, is depicted in the figures as an empty circle, for example as shown at 502.

According to some embodiments of the present invention, the position and shape of the current user stroke is matched with stroke specifications which are associated with notations, such as slash, punctuations, such as colon and/or mathematical operations, such as minus and plus, for example as shown in FIG. 8.

Figure 9:
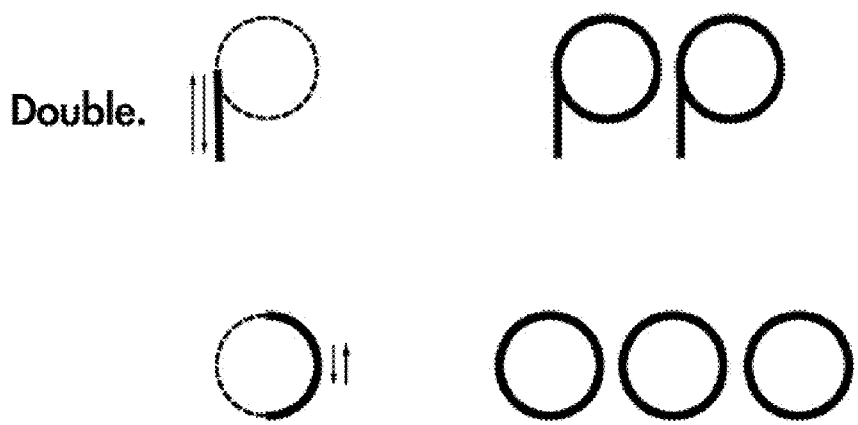
FIG. 9 depicts a schematic illustration of a stroke specification of a user stroke comprising sequential sub strokes with opposing directions and indicative of two or three repetitive alphabetic characters, according to some embodiments of the present invention.

According to some embodiments of the present invention, one or more of the stroke specifications define a unique combination of shape and relative position parameters, for example as described above, with a stroke direction parameter. In such an embodiment, strokes having an identical shape and relative position may have a different and/or a cumulative meaning if they are performed in opposing directions. For example, FIG. 9 depicts a stroke specification of a user stroke with is comprised of sequential sub strokes with opposing directions and indicative of two or three repetitive alphabetic characters.

Optionally, the stroke specifications includes a first group wherein each member is associated with a lower case of a certain alphabetic character and defines a unique combination of shape, position, and direction stroke parameters and a second group wherein each member respectively associated with an upper case of the certain alphabetic character and defines a combination of shape and relative position parameters that is similar to a respective combination of one of the members of the first group and an opposing direction stroke parameter. For example, while a first stroke specification is associated with a lower case representation of the alphabetic character "C" and defines a c-shaped stroke that is performed from bottom to top above the left semicircle of a circular reference zone a second stroke specification is associated with the upper case representation of the alphabetic character "C" and defines a c-shaped stroke that is performed from top to bottom on the same left semicircle.

Optionally, the stroke specifications are associated with system commands, for example Copy, Paste, Caps Lock and Cut and/or editing commands, for example Bold, Italic and the like.

According to some embodiments of the present invention, one or more of the stroke specifications define a unique combination of shape and relative position parameters, for example as described above, with a pressure level parameter. In such an embodiment, the pressure that is applied during the stroke of the user may change the selected stroke specification.

According to some embodiments of the present invention, one or more of the stroke specifications define a unique combination of shape and relative position parameters, for example as described above, with an additional user interface input parameter. In such an embodiment, if the user makes a selection and/or presses on a certain key, for example SHIFT and "adjust volume" in a human user interface that is integrated into a phones, than the selected stroke specification may be changed. Optionally, the additional user interface input is a simultaneous click on the top of the input surface.

Figure 10:
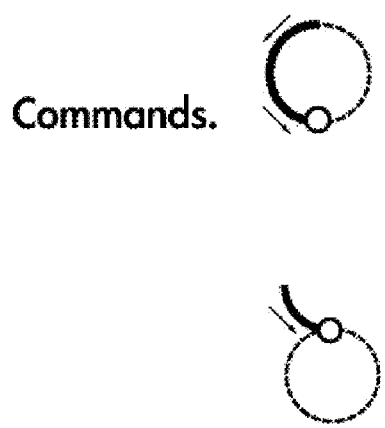
FIG. 10 depicts a C-shaped stroke that is performed on the boundaries of a circular reference zone and a curved stroke that is ended on the top of the circular reference zone, both ended with an interlude, according to some embodiments of the present invention.

According to some embodiments of the present invention, one or more of the stroke specifications define an interlude performed during and/or just after the stroke. For example, FIG. 10 depicts a C-shaped stroke that is performed on the boundaries of a circular reference zone and curved stroke that is ended on the top of the circular reference zone, both ended with an interlude in which the pointing element is maintained for a period, for example for 2-3 seconds, according to some embodiments of the present invention. In the exemplary stroke specification depicted in FIG. 9, the interludes differentiate between a C-shaped stroke and S-shaped stroke which are performed on the boundaries of the a circular reference zone and respectively indicative of the alphabetic character C and S and similar C-shaped and S-shaped strokes which are respectively indicative of the command COPY and SAVE.

Figure 11:
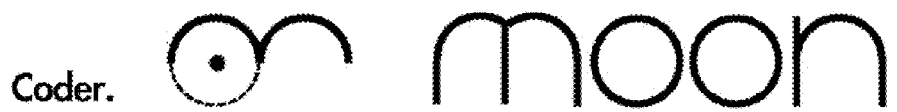
FIG. 11 is a schematic illustration of a stroke specification associated with a word, according to some embodiments of the present invention.

According to some embodiments of the present invention, one or more of the stroke specifications define specific words, for example as depicted in FIG. 11, for example common words, optionally selected according to dynamic statistical analysis of usage patterns recorded by the human user interface 200, a central server collecting data from a group of human user interface 200, optionally via a computer network, such as the internet. In other embodiments, the data is static and provided in advance, and/or when updating the human user interface 200.

According to some embodiments of the present invention, the user assigns custom strokes to different characters, words, and/or commands. In such embodiments, the human user interface presents a graphical user interface (GUI) that allows the user to create a custom stroke specification with unique combination of stroke shape and relative position, optionally with an interlude, repatriation, and/or a direction, and to associate the created stroke specification with a character, a word, or a command. For example, a user may create a stroke specification with a unique combination and associate the unique combination with a command triggering an operation related to a device using the human user interface 200. For example, if the device is a cellular phone and/or a tablet, the unique combination may be associated with a lock touchpad screen operation, power off operation, volume control operation, and the like.

Figure 12A:
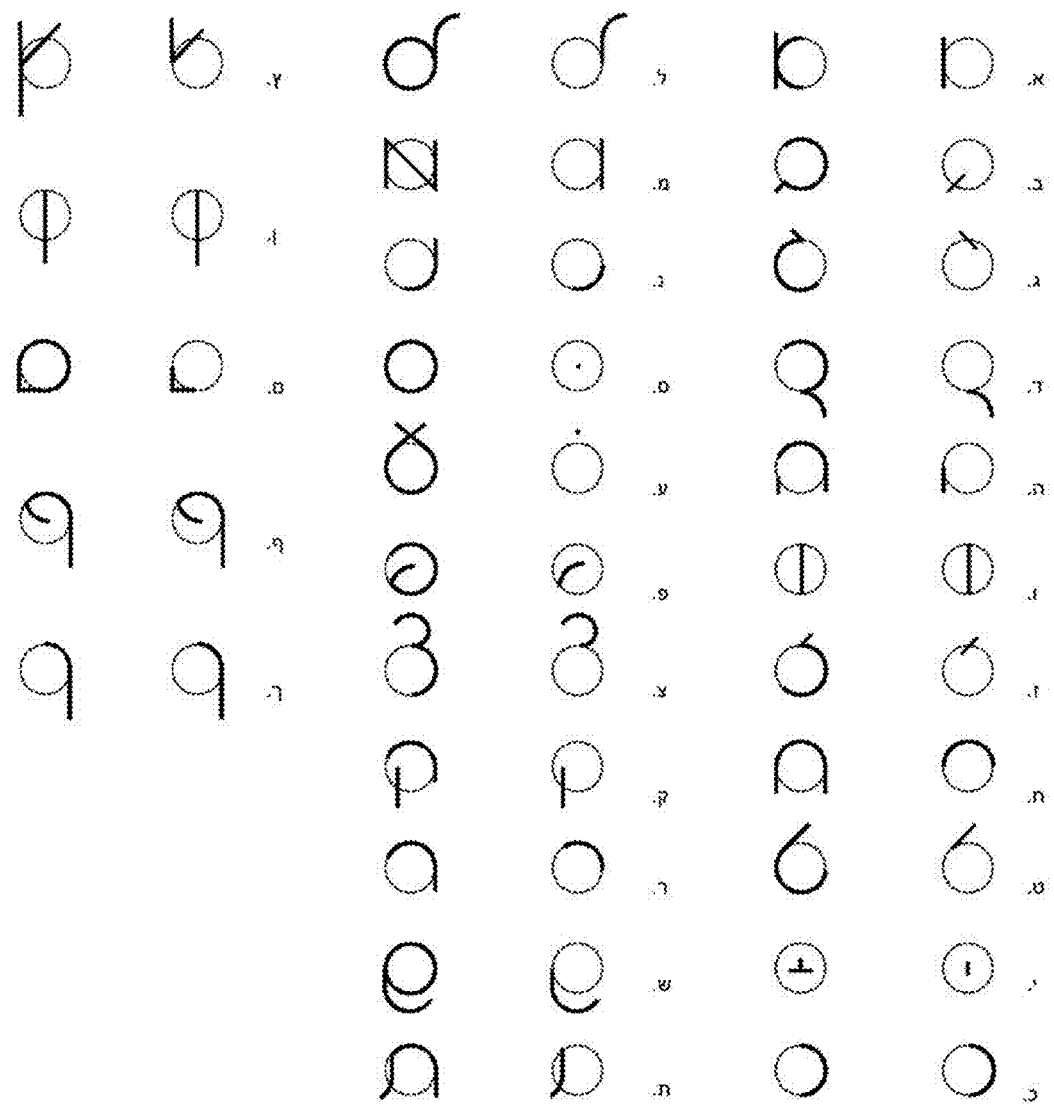
FIG. 12A is a schematic illustration of a set of Hebrew alphabetic characters which are associated with a number of stroke specifications, according to some embodiments of the present invention.

As described above, some embodiments of the invention allows a user to input alphabetic characters of one or more different natural language alphabets. FIG. 12A describes a set of Hebrew alphabetic characters which are associated with a number of stroke specifications that define unique combinations of shape and relative position, according to some embodiments of the present invention. Similarly to FIG. 3, each alphabetic character is associated with two stroke specifications.

Optionally, the human user interface 200 is designed to receive alphabetic characters of a certain natural language alphabet at the time. In such a manner, a predefined clicking or sliding may be used for changing the natural language alphabet. Optionally, the human user interface 200 allows the user to input alphabetic character of two or more natural language alphabets without indicating a language swap. In such an embodiment, similar strokes may be differentiated according to the direction of the slide, the previously inputted alphabetic characters and/or creating two or more sets of alphabetic characters, each of a different natural language alphabet, so that each alphabetic character of any of the sets is associated with a different unique combination.

As described above, the reference zone may be presented on the input surface. In such an embodiment, the space bounded by the reference zone, and optionally an additional space that encircles the reference zone, functions as a touchpad. In use, the user slides her finger over the reference zone to move a curser that is displayed on the input surface, for example using mouse like movements. Optionally, one of the stroke specifications is associated with a command that activates and/or deactivate the reference zone as a touchpad. Optionally, the human user interface 200 includes a curser module, which is similar to known touchpad modules, for converting the strokes of the user to curser control commands.

According to some embodiments of the present invention, two reference zones are presented the input surface and/or each on a different input surface. In such an embodiment, the user may use both his hands for inputting alphabetic characters, digits, and/or commands. For example, the two reference zones are presented so as to allow the user to slide, simultaneously, or substantially simultaneously, his thumbs on in proximity or over the reference zones. In such an embodiment, alphabetic characters may inputted by a combination of strokes which are inputted simultaneously, or substantially simultaneously, in relation to the two reference zones.

As described above, the stroke may be performed by a user's finger, a stylus, a pen, and/or any other pointing device. Optionally, the input surface is adjusted, dynamically or statically, according to the properties of the used pointing device, for example the width if the tip of the pointing element. Optionally, the estimated pressure level, conductive coupling level, and the like are also adjusted according to the estimated pointing element.

According to some embodiments of the present invention, alphabetic characters and/or numbers inputted using the aforementioned device and/or method are forwarded to a predictive text module. The predictive text module estimates complementary alphabetic characters and/or numbers according to a dictionary. The complementary alphabetic characters are selected to complete words estimated to match the intention of the user. The predictive text module optionally functions based on commonly known algorithms, for example T9™ algorithm, which the specification thereof is incorporated herein by reference. The combination of the predictive text allows the user to input serially words with fewer strokes.

According to some embodiments of the present invention, alphabetic characters and/or numbers inputted using the aforementioned human user interface 200 and/or method are forwarded to a spellchecking module. The spellchecking module suggests corrections to words which are compiled from alphabetic characters and/or numbers which are inputted using the aforementioned human user interface 200 and/or method, for example as described above.

According to some embodiments of the present invention, alphabetic characters and/or numbers inputted using the aforementioned device and/or method are forwarded to a search module. The alphabetic characters and/or numbers are optionally sent in real time, while the pointing element generates additional strokes. The search module searches a local database and/or one or more indexes which are based on one or more databases which are accessible by the human user interface 200. In such an embodiment, the user dynamically refines search results while sliding the pointing element over the input surface, making new user strokes.

According to some embodiments of the present invention, a plurality of reference zones are displayed on an input surface, such as an interactive table, for example Microsoft Surface™. In such an embodiment, a plurality of users can simultaneously input characters and/or commands to a single input surface. Optionally, the reference zones may be dragged and dropped in various locations along the input surface. In such a manner, the users are not forced to enter data in a certain segment of the input surface. Optionally, different reference zones are assigned to different applications, allowing the user to input simultaneously, or substantially simultaneously, characters and/or commands to different applications.

According to some embodiments of the present invention, the size of the reference zone is adjustable. In such an embodiment, the stroke specifications are adjusted to fit the size of the reference zone. For example, the stroke shape and relative position of each stroke specification are adjusted to fit the new dimensions of the reference zone. Optionally, a large reference zone, such as a circle having a radius of 4 cm or more, is selected for children and/or visually impaired users. In another embodiment, a small reference zone, such as a circle having a radius of 2 centimeters or less, is selected in order to avoid concealing applications which are presented on the input surfaces and/or to fit in touch displays with a limited size.

Figure 12B:
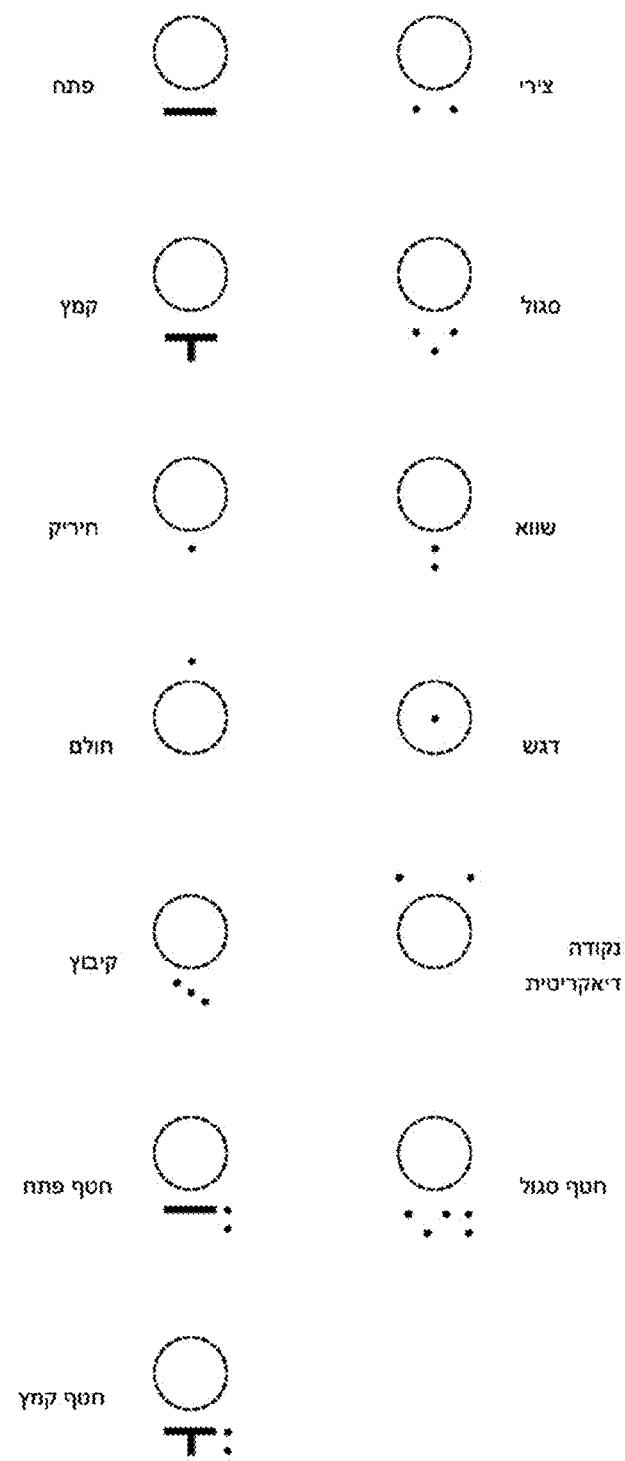
FIG. 12B is a schematic illustration of a set of Hebrew punctuations, according to some embodiments of the present invention.

According to some embodiments of the present invention, the region that is bound by the outline of the reference zone is used as a magnifier that magnifies an area in proximity to a curser that is displayed on a device controlled by the human user interface 200. For example, if the human user interface 200 is used for inputting characters to a computing unit, such as a laptop or a Smartphone, the area in proximity to the curser that is displayed on the screen of these devices is enlarged. Such a magnification allows the user to see exactly the selection area of a curser. In such a manner, the user can edit words without having to enlarge text segments which are displayed on the screen of the controlled device. Optionally, a number of reference zones are presented simultaneously and separately magnifying sequential areas of the display, for example the area that is parallel to the display from the left and the right sides of the cursor. Optionally, the magnifying allows the user to select and punctuate an alphabetic character. For example, FIG. 12B depicts various Hebrew punctuations.

According to some embodiments of the present invention, the human user interface 200 is used as a user interface of electric articles, such as cameras, laser pointers, navigation systems, such as global positioning system (GPS) based systems, video recorders, music players, cellular phones, phones, audio recorders and/or any electric device having a limited size for user interfaces. The human user interface 200 may be integrated as an independent unit that is integrated into the electric article instead or in addition to an existing user interface, such as a keypad, or provided as part of the electric article.

For example, when combined with landline phone and/or cellular phones, the human user interface may allow the user to provide a text for a short message service (SMS), update and/or search a contact book, a calendar, an electric notebook, and/or any other application that require character based operation.

According to some embodiments of the present invention, the human user interface 200 is integrated into a man machine interface device, for example a mouse, a joystick and/or a gaming console control unit, such as a Wii™ Nunchuk controller, a Wii™ remote, an Xbox™ controller. Such integration enhances the input capabilities of the user interface. For example if the user interface is a mouse, the user may use the enhanced mouse for inputting alphabetic characters and/or controlling to objects and/or application simultaneously, or substantially simultaneously.

According to some embodiments of the present invention, the human user interface 200 is integrated a device to aid disabled to operate electric devices, for example computers, wheelchairs, and/or any other device. As the human user interface 200 allows inputting data using strokes, disabled people with limited motoric abilities can use the device easily relatively to user interface that require more complex movements, such as keyboards and the like.

According to some embodiments of the present invention, the human user interface 200 is integrated into an augmented imaging and/or virtual reality system. In such an embodiment, the reference zone, and the inputted characters are displayed on the presentation unit of these systems, for example on a designated per of glasses and/or a designated screen. It should be noted that as the human user interface 200 is intuitive the user does not have to avert her gaze from the display of the augmented imaging and/or virtual reality system.

In another example, when combined with digital camera and/or video camera, the human user interface 200 allows the user to provide characters and/or commands for tagging photos, editing photo details, and/or controlling Camera Functions.

According to some embodiments of the present invention, the device is integrated into a miniature electronic device, such as a miniature cellular phone, for example as described in US Patent Application No. 2009/0176528 and U.S. Pat. No. 7,509,094, which the content thereof is included herein by reference. Such an integration is adventurous as is does not require increasing the dimensions of the miniature electronic device, adding a keyboard or an external user interface thereto or the like. Furthermore, as the human user interface 200 may be implemented on a touch screen of the miniature device, no buttons will be needed for allowing user to insert characters and/or commands with a single action such as a stroke. The user does not have to mark a character from a displayed set and/or to press a certain button a number of time only in order to select an alphabetic character, for example as used with common cellular phone keypads.

According to some embodiments of the present invention, the method 100 is executed on a client terminal, such as a Smartphone, a music player, a laptop having a touchpad, and a computerized touch screen, for example as an add-on, such as a browser add-on.

Optionally, the method implemented on a server that is connected to a network. In such an embodiment, strokes may be recorded in client terminals, which are connected to the network and forwarded, over the network, to the server. This allows a user to use her client terminal for recording strokes and forwarding the strokes as inputs to servers that decode the strokes according to their shape and relative position.

According to some embodiments of the present invention, the human user interface 200 is an independent device that interfaces with one or more computing devices, such as client terminals. Optionally, the output interface 204 includes a communication interface, such as a Bluetooth™ interface and/or a Wi-Fi™ interface that forwards the characters and/or commands to the one or more computing devices. In such an embodiment, the device is used as a remote control and/or a remote user interface that allows users to input characters and/or commands. Optionally, the human user interface 200 interfaces with a computer and used for inputting characters as a full QWERTY keyboard.

According to some embodiments of the present invention, the human user interface 200 housed in a thin housing, optionally of less than 10 mm width, for example 2 mm wide. In such an embodiment, a thin input surface 201 is used. Optionally, the dimensions of such a device are less than 10 centimeters. In such an embodiment, the human user interface 200 may be carried by the user, for example in her wallet, and used as a portable keyboard that may be connected to different computing units and/or as a remote control which is adapted to control various devices. Such a thin human user interface 200 may be glued or otherwise attached to fabrics, walls, metal surfaces, wood surfaces, and/or to any surface. In such a manner, the human user interface may be used for controlling, remotely or locally, various devices.

According to some embodiments of the present invention, the human user interface 200 is used for controlling vehicle systems, for example navigation systems, audio systems, and/or operation systems. Optionally, the human user interface 200 is attached to the top of a gear stick and/or a steering wheel, allowing the driver to input characters and/or commands without removing her hand from the gear stick and/or the steering wheel. It should be noted that such an inputting is facilitated only as the human user interface 200 allows using one or more fingers, such as the thumb, for inputting a large number of characters, such as alphabetic characters of one or more languages.

In some embodiments of the present invention, the human user interface 200 forwards a signal that is indicative of the recorded strokes. Optionally, the stroke recognition, which is implemented by the aforementioned stroke recognition module 203, is performed by the interfacing computing devices. In such an embodiment, the stroke recognition module 203 may be implemented on the interfacing computing devices.

Optionally, the human user interface 200 is used as a learning remote control that is used to control any number of pairing devices. Optionally, the human user interface is used to control devices with no other user interface, for example cameras, such as surveillance cameras and the like. Optionally, the human user interface is used as a presentation controller, TV remote control, set top box remote control, and the like.

Figure 13:
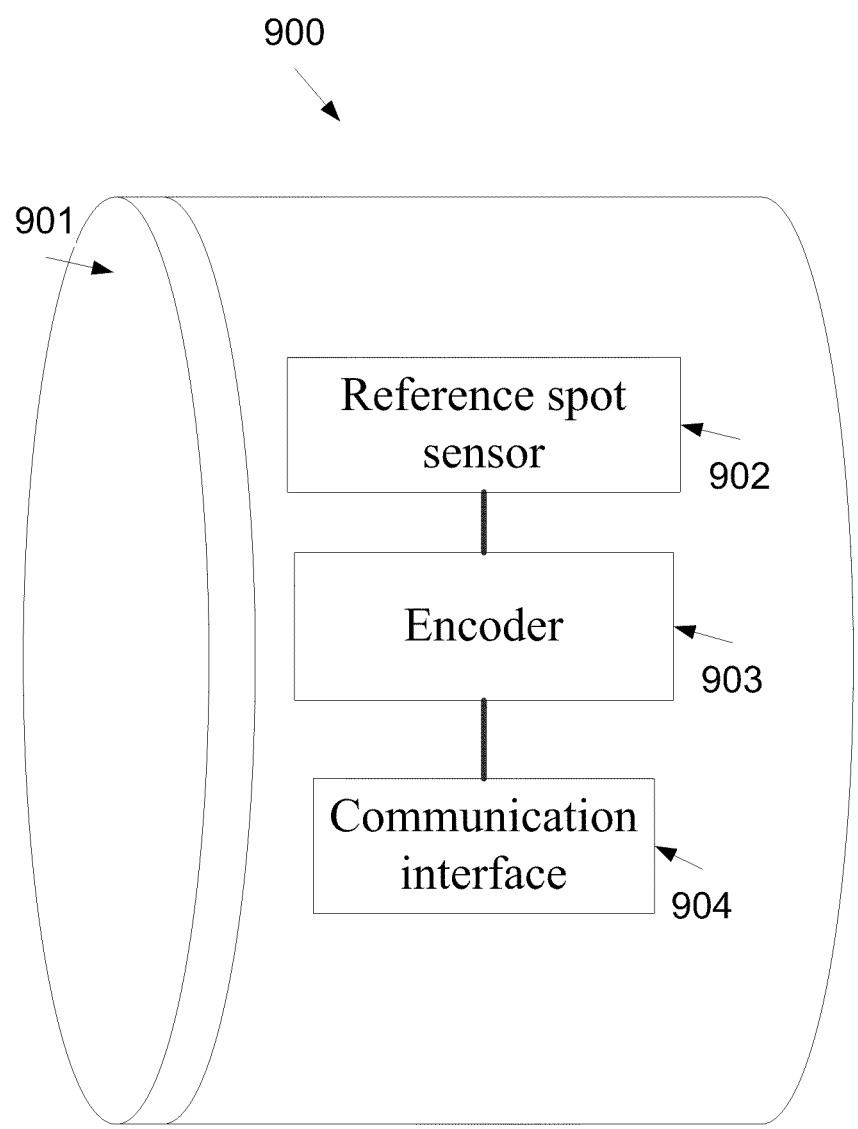
FIG. 13 is a schematic illustration of a finger gripping device, according to some embodiments of the present invention.

Reference is now made to FIG. 13, which is a schematic illustration of a finger gripping device 900 of inputting characters and/or commands to a computing unit, according to some embodiments of the present invention. The finger gripping device 900 includes a finger holding element 901, such as a ring, a thimble, or a finger protecting covering, such as a glove, for gripping a finger of a user. The finger holding element 901 supports a reference spot sensor 902 for monitoring a finger gesture relative to a reference spot. The finger holding element 901 further supports an encoder 903 that creates a slide signal indicating the finger gesture in relation to the reference spot. The reference spot sensor 902 and encoder 903 may be separated components or integrated as a single component. Optionally, the reference spot sensor 902 includes a number of sensors, each designed to detect a slant, a roll, and/or a deviation of the finger gripping device relative to the reference spot. For example, the reference spot sensor 902 includes a rotation sensor that senses rotational movement of reference spot sensor 902 relative to the reference spot a rotation encoder that causes a rotation signal to be generated that indicates at least an extent to which the reference spot sensor 902 has been rotated relative to reference spot, and, optionally, a direction of such rotation.

Optionally, the finger gripping device 900 includes a communication interface 904, such as a Bluetooth™ interface and/or a Wi-Fi™ interface, forwards the signal to a computing unit that performs accordingly stroke recognition, for example similarly to the described above. The computing unit receives the slide signal and may now match the finger gesture with stroke specifications which are associated with a plurality of characters and commands, for example similarly to the described above. The shape of the finger gesture and the position of this shape in relation to the reference spot are matched with the shape and relative position parameters which of the stroke specification. Now, after a match is found, a character and/or a command that is associated with the matched stroke specification may be used.

Optionally, the reference spot sensor 902 is based on one or more optical sensors, such as image sensors, that calculate the finger gesture relative to the reference spot by a known image processing processes. Optionally, the reference spot is set in advance. For example, the reference spot sensor 902 includes one or more optical sensors that capture one or more reference images which are used as a reference spot. Optionally, the reference spot is a segment that is selected in the one or more reference images. The aforementioned finger gesture is calculated relatively to the reference images.

It should be noted that in such an embodiment, the user may only move the finger in order to create an input that is indicative of a character and/or a command. In such a manner, user inputs may be created without much effort.

Figure 14:
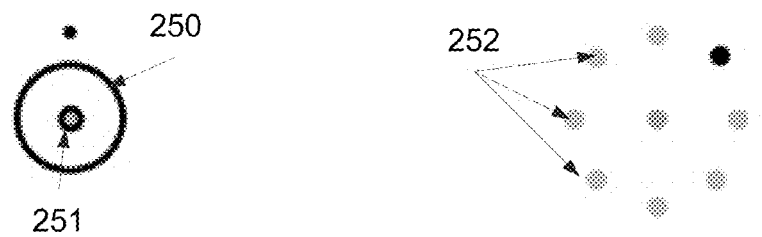
FIG. 14 is a schematic illustration of a reference zone that is used for controlling a command menu, according to some embodiments of the present invention.
Figure 15:
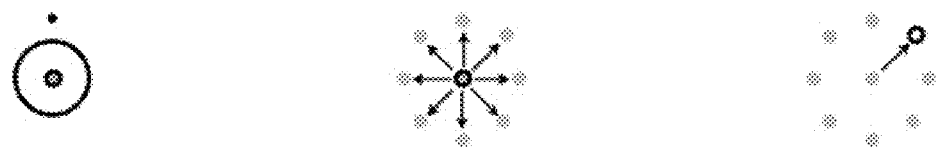
FIG. 15 is a schematic illustration of a reference zone that is used for controlling a command menu by strokes, according to some embodiments of the present invention.

Reference is now made to FIG. 14, which a schematic illustration of a reference zone that is used for controlling a command menu, optionally hierarchical, according to some embodiments of the present invention. The reference zone 250 is optionally as described above and depicted, for example, in FIG. 2. Apart from being used as a reference for the position of the user strokes, the reference zone may be used for converting a user stroke and/or click to a menu selection and/or navigation. In such a manner, a limited area in and around a reference zone that is displayed by an input surface, for example as described above, may be used for intercepting user strokes and/or clicks for both character and/or command inputs and menu selection and navigation. This ability allows using a limited size human user interface, such as a 4.4 centimeters touch screen, as a user input capable of providing full control over an electric device, such as a cellular phone, a personal digital assistant (PDA), and/or any other multi application device. In such an embodiment, the human user interface 200 has a writing mode in which the aforementioned stroke recognition process is implemented and a menu mode in which the human user interface 200 allows the user to navigate and make menu selections. When switching to the menu mode, for example by clicking on the center of the reference zone 251 that is optionally a circle, a plurality of virtual selection buttons 252 are presented on the perimeter of the reference zone. Now, the user may select one of the selection options 252, for example by clicking thereon and/or by siding the pointing element from the center toward the selection options, for example as shown at FIG. 15.

In such an embodiment, the human user interface 200 allows the user to both input alphabetic characters and digits and make menu selections according to a stroke based on a continuous touch gesture. It should be noted that the same reference area may allow the user to control a curser of a mouse, for example as described above, using stroke based on a continuous touch gestures.

As outlined above, the menu may be a hierarchical. In such an embodiment, each click on one of the virtual selection buttons triggers a swap in the virtual selection buttons which are presented to the user. For example, the first menu that is displayed is a primary sub menu, for example a menu of some or all of the applications which hosted by a device that uses the human user interface 200 or the primary sub menu which currently receives inputs from the human user interface 200, for example as shown at 451 of FIG. 16. Then, after the user clicks on one of the virtual buttons, a secondary sub menu appears, for example as shown at 452 of FIG. 16. Clicking on one of the virtual buttons may trigger the execution of an application, sub application or the like, and/or trigger a swap between the secondary sub menu and a tertiary sub menu. Such a progress along the hierarchical menu may proceed until the last sub menu is displayed to the user.

Figure 16:
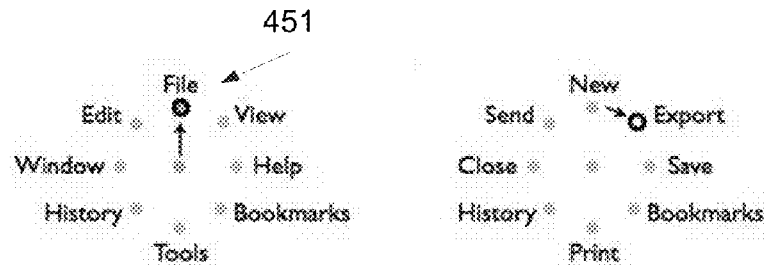
FIG. 16 is a schematic illustration of a reference zone that is used for controlling a hierarchical menu, according to some embodiments of the present invention.
Figure 17:
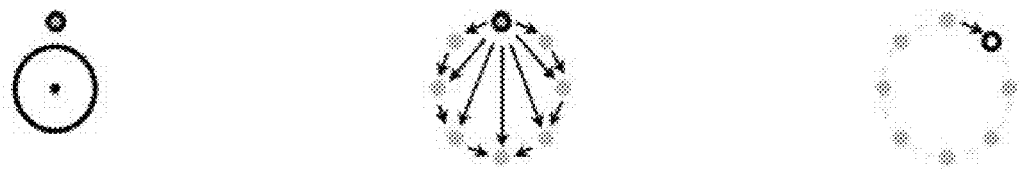
FIG. 17 is a schematic illustration of a reference zone that is used for controlling a hierarchical menu by strokes, according to some embodiments of the present invention.

Optionally, navigation among the virtual buttons in the menus is performed by strokes, for example as shown at 453 of FIG. 16 or in the navigation in FIG. 17.

Optionally, the user navigates along the sub menus of the hierarchical menu with a stroke based on a continuous touch gesture. Each time the user slides the pointing element on top of a virtual button that is indicative of a sub menu, the displayed menus swap. When the user releases the pointing element, for example detaches the pointing element from the input surface, a selection is made. In such a manner, the user navigates through a number of sub-menus in a stroke based on a continuous touch gesture.

It is expected that during the life of a patent maturing from this application many relevant systems and methods will be developed and the scope of the term controller, input surface, finger griping device, and a pointing element is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", an and the include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of inputting a character to a computing unit, comprising:
   displaying a reference zone on a touch screen;
   capturing a stroke drawn by a user in relation to said reference zone;
   identifying a combination of a shape and a relative position of said stroke in relation to said reference zone;
   automatically selecting one of a plurality of characters from according said combination; and
   providing said selected character as an input to the computing unit from said user;
   wherein at least a portion of said stroke deviates from the boundaries of said reference zone;
   wherein said reference zone is a virtual circle;
   wherein a joint outline of said stroke and of said reference zone depicts a form of said selected character.

2. The method of claim 1, further comprising sequentially repeating said capturing, said identifying said selecting, and said providing so as to create a text paragraph.

3. The method of claim 1, wherein said stroke is a continuous touch gesture of said user on a touch screen.

4. The method of claim 3, wherein said user uses a thumb for performing said stroke.

5. The method of claim 1, further comprising dynamically changing the size of said reference zone according to said captured stroke.

6. The method of claim 1, further comprising adjusting said selected character according to a member of a group consisting of: a pressure applied during said stroke, a direction of said stroke, a pace of said stroke, a pressure applied on an input surface performing said capturing, an additional input received by a device performing said capturing, and an additional stroke performed by a touch gesture on an input surface performing said capturing.

7. The method of claim 6, wherein said adjusting comprises selecting between an upper case and a lower case of said character.

8. The method of claim 1, wherein said stroke is a touch gesture applied on an input surface.

9. The method of claim 1, further comprising detecting an interlude in a movement of a pointing element used for performing said stroke, said identifying being performed according to said combination and said interlude.

10. The method of claim 8, further comprising measuring a level of a pressure applied during said touch gesture, said identifying being performed according to said combination and said level.

11. The method of claim 1, further comprising detecting a direction of said stroke, said identifying being performed according to said combination and said direction.

12. The method of claim 1, wherein said automatically selecting comprises automatically selecting one of said plurality of characters and a plurality of commands for execution by said computing unit.

13. The method of claim 1, wherein said plurality of characters comprises alphabetic characters, digits, punctuations, and mathematical operations.

14. The method of claim 1, wherein said computing unit is selected from a group consisting of: a cellular phone, a phone, a remote control, an electric book, a game console, a camera, a laser pointer, a navigation system, a video recorder, a music player, and an audio recorder.

15. The method of claim 1, wherein said identifying comprises identifying a combination of said shape, said relative position, and at least one member of a group consisting of a direction of said stroke, an interlude performed during said stroke an interlude performed during said stroke, a user input received during said stroke, and a pressure applied during said stroke.

16. The method of claim 1, wherein plurality of characters comprises alphabetic characters of a plurality of languages.

17. The method of claim 1, further comprising magnifying an editing area displayed in a presentation device, said character being imputed to said editing area.

18. A human user interface of allowing a user to input a character to a computing unit, comprising:
   an input surface for displaying a reference zone on a touch screen and capturing a stroke drawn by a user in relation to said reference zone;
   an encoder for encoding a shape and a relative position of said stroke in relation to said reference zone;
   a stroke recognition module for automatically identifying a character of a plurality of characters according to said shape and relative position; and
   an outputting interface for outputting said character;
   wherein at least a portion of said stroke deviates from the boundaries of said reference zone;
   wherein said reference zone is a virtual circle;
   wherein a joint outline of said stroke and of said reference zone depicts a form of said selected character.

19. The human user interface of claim 18, further comprising a memory for hosting a plurality of stroke specifications, at least one of said plurality of stroke specifications being indicative of one of said plurality of characters, said automatically identifying comprises identifying a unique combination of said shape and said relative position and selecting said character by identifying a match between said unique combination and one of said plurality of stroke specifications.

20. The human user interface of claim 19, wherein at least one of said plurality of stroke specifications is indicative of a word, said stroke recognition module being configured for selecting said word by identifying a match between said unique combination and one of said plurality of stroke specifications.

21. The human user interface of claim 18, wherein said input surface is a click wheel and said reference zone being a circle, said circle and said click wheel being concentric.

22. The human user interface of claim 18, wherein said stroke is performed by a pointing element of a group consisting of: a finger, a stylus, and a laser marker.

23. The human user interface of claim 22, wherein said input surface is configured for capturing said stroke by detecting a continuous touch gesture of said pointing element, each said character being a different character of a natural language alphabet.

24. The human user interface of claim 18, wherein said input surface is configured for displaying said reference zone thereon.

25. The human user interface of claim 24, wherein said input surface is configured for displaying a menu in said reference zone, said stroke recognition module being configured for navigating in said menu according to said stroke.

26. The human user interface of claim 25, wherein said menu is a sub menu of a hierarchical menu, said stroke recognition module being configured for navigating in said menu hierarchical menu and respectively instructing a display of a plurality sub menus according to said stroke.

27. The human user interface of claim 24, wherein said stroke is performed by at least one of a click and a touch gesture.

28. The human user interface of claim 18, wherein said reference zone is circular.

29. The human user interface of claim 18, wherein said reference zone is rendered on said input surface.

30. The human user interface of claim 18, wherein said user interface is configured to allow said user to reposition said reference zone in relation to the orientation thereof.

31. The human user interface of claim 30, wherein said input surface is configured for capturing at least one of an additional stroke and a click, said stroke recognition module being configured to adjust said character according to said at least one additional stroke and click.

32. The human user interface of claim 18, wherein said device is integrated into a handheld device, said character being used as a user input of an application executed by said handheld device.

33. The human user interface of claim 18, wherein said outputting interface is wireless interface configured to forward said character to an external device.

34. The human user interface of claim 19, wherein first and second of said plurality of stroke specifications are respectively indicative of a lower case form and an upper case form of an alphabetic character, said first stroke specification being matched with a first stroke having a first outline and said second stroke specification being matched with a second stroke having a second stroke, said second stroke comprising said first stroke.

35. The human user interface of claim 19, further comprising a user interface module for allowing a user to associate at least one of said plurality of stroke specifications with a member of a group consisting of a character, a command, a digit, and a paragraph, said stroke recognition module being configured for selecting said member by identifying a match between said unique combination and said at least one stroke specification, said outputting interface being configured for outputting said member.

36. The human user interface of claim 18, wherein said input surface is attached on a man machine interface device.

37. The human user interface of claim 18, further comprising a curser module configured for moving a curser according to said stroke.

38. The human user interface of claim 18, wherein said input surface is configured for displaying a plurality of reference zones and capturing a plurality of strokes each separately performed in relation to one of said plurality of reference zones, said stroke recognition module being configured for separately performing said identifying and selecting for each said separately performed stroke so as to allow said outputting interface to output a plurality of characters to at least one application accordingly.

39. The human user interface of claim 18, further comprising a housing having a width of less than 5 millimeters for supporting said input surface, said encoder, and said stroke recognition module.

40. The human user interface of claim 39, wherein said housing is attached to a surface of a device, said outputting interface configured for outputting said character as input to said device.

41. The human user interface of claim 18, wherein said input surface is mounted on top of at least one of a gear stick and a steering wheel and said outputting interface being configured for outputting said character to a vehicle system.

42. A method of inputting a character, comprising:
  displaying a circular reference zone on a touch screen;
  capturing a stroke drawn by a user and outline a form of a character in combination with an outline of said circular reference zone;
  computing said character according to a of said stroke in relation to said circular reference zone; and
  outputting said character as an input of said user;
  wherein at least a portion of said stroke deviates from boundaries of said circular reference zone;
  wherein a joint outline of said stroke and of said circular reference zone depicts a form of said selected character.

43. The method of claim 42, wherein at least one of said form and said reference zone is mnemonic for said character.

44. A human user interface of allowing a user to input a character to a computing unit, comprising:
  a reference spot sensor for measuring a finger gesture performed in relation to a circular reference spot;
  a finger holding element for mounting said sensor on a finger of a user;
  an encoder for encoding a shape and a relative position of said finger gesture in relation to said circular reference spot; and
  stroke recognition module for automatically identifying a character according to said shape and said relative position;
  wherein at least a portion of said stroke deviates from boundaries of said circular reference spot;
  wherein a joint outline of said stroke and of said circular reference zone depicts a form of said selected character.

45. The human user interface of claim 44, wherein said stroke recognition module is hosted on a computing unit and configured for forwarding said character thereto, further comprises an outputting interface for transmitting said shape and said relative position to said stroke recognition module.

46. The human user interface of claim 44, wherein said circular reference spot sensor comprises at least one image sensor for capturing an image and using one of said image and a portion of said image as said circular reference spot.

47. A human user interface of allowing a user to input a character to a computing unit, comprising:
- a touch screen for presenting a reference zone and a menu on said reference zone and for capturing a plurality of strokes drawn by a user, each said stroke being performed in relation to said reference zone and deviates from the boundaries thereof; and
- a stroke recognition module for automatically identifying a character of a plurality of characters and navigating in said menu, each one of said identifying and navigating being performed according to a different stroke of said plurality of strokes;
- wherein said reference zone is a virtual circle;
- wherein a joint outline of said stroke and of said circular reference zone depicts a form of said selected character.

48. The human user interface of claim 47, wherein each said stroke is a performed by a continuous touch gesture on said touch screen.

49. The human user interface of claim 47, wherein said stroke recognition module is configured for selecting menu items of said menu according to said plurality of strokes.

50. The human user interface of claim 47, wherein each said stroke is performed as a discrete and continuous touch gesture performed on said touch screen, said stroke recognition module being configured for navigating among a plurality of sub menus according to said stroke.

51. The method of claim 1, wherein each said plurality of characters having first and second nonoverlapping portions; said automatically selecting comprising automatically selecting one of said plurality of characters so that the pattern of said stroke matches at least said first portion and the pattern of said reference zone matches said second portion.

52. The method of claim 1, further comprising displaying said reference zone on a touch screen; wherein the location of said reference zone on said touch screen may be adjusted by said user.

53. The method of claim 1, further comprising displaying said reference zone on a touch screen; wherein the size of said reference zone on said touch screen may be adjusted by said user.

* * * * *